US005112672A

United States Patent [19]

Kaule et al.

[11] Patent Number: 5,112,672

[45] Date of Patent: May 12, 1992

[54] SECURITY DOCUMENT HAVING AN ELECTRICALLY CONDUCTIVE SECURITY ELEMENT EMBEDDED THEREIN

[75] Inventors: Wittich Kaule, Emmering; Wilhelm Ilgmann, Wolfratshausen; Gerhard Schwenk, Puchheim; Gerhard Stenzel, Munich, all of Fed. Rep. of Germany

[73] Assignee: GAO Gesellschaft fur Automation und Organisation mbH, Fed. Rep. of Germany

[21] Appl. No.: 454,624

[22] Filed: Dec. 21, 1989

[30] Foreign Application Priority Data

Dec. 21, 1989 [DE] Fed. Rep. of Germany ....... 3843075

[51] Int. Cl.[5] ......................... B32B 15/08; B32B 3/16

[52] U.S. Cl. ....................................... 428/209; 283/82; 283/83; 429/7; 428/457; 428/900; 428/916

[58] Field of Search .................... 427/7; 428/195, 209, 428/900, 916, 901, 457, 323; 283/72, 82, 83

[56] References Cited

U.S. PATENT DOCUMENTS

| | | | |
|---|---|---|---|
| 4,183,989 | 1/1980 | Tooth | 428/195 |
| 4,231,593 | 11/1980 | Bell, Jr. et al. | 283/6 |

FOREIGN PATENT DOCUMENTS

| | | |
|---|---|---|
| 640232 | 6/1935 | Fed. Rep. of Germany . |
| 2909731 | 9/1979 | Fed. Rep. of Germany . |
| 472081 | 4/1969 | Switzerland . |

*Primary Examiner*—Thomas J. Herbert, Jr.

*Attorney, Agent, or Firm*—Bacon & Thomas

[57] ABSTRACT

A security document is equipped with a security element in the form of a thread or strip that is characterized by, among other things, the property of electrical conductivity. The security element is provided for this purpose with a metal coating associated with a second layer that is also electrically conductive but made of a material that maintains its electrical conductivity in spite of mechanical stress such as bending, stretching, etc. Breaks in the metal layer which might occur when the thread is being embedded in the security document or during daily use thus do not result in a complete interruption in the electrical connection, but are bridged by the second, electrically conductive layer.

19 Claims, 1 Drawing Sheet

SECURITY DOCUMENT HAVING AN ELECTRICALLY CONDUCTIVE SECURITY ELEMENT EMBEDDED THEREIN

BACKGROUND OF THE INVENTION

The present invention relates to a security document having an embedded security element in the form of a thread or strip comprising a carrier sheet preferably made of plastic material and a metal coating.

It is known to protect security documents, in particular securities, bank notes, identity cards or the like, from unauthorized imitation by embedding so-called "security threads". The embedding in the paper mass of a bank note constitutes a great obstacle for forgers since such embedding can only be performed during the production of the paper and not subsequently. In addition, security threads are used which are characterized by special properties and can be tested for authenticity in the embedded state by machine and/or visually. A frequent test criterion is e.g. the electrical conductivity.

It is known from Swiss patent no. 472 081, for example, to provide bank notes with metal threads which can be tested for electrical conductivity or their response to X-rays. However, these metal threads are relatively inflexible and break easily during daily use. The electrical conductivity can thus be measured only in some areas and no longer over the entire width of the bank note.

One has therefore begun providing rayon threads or plastic sheets with a metal coating and embedding these sheets in bank note paper in the form of strips (German patents nos. 640 232, 27 54 267). This thread is characterized by high flexibility but in practice the metal coating very often shows cross-cracks which lead to an interruption in the electrical conductivity, so that this feature can again not be used as an unambiguous authenticity feature or involves high reject rates during later testing.

The reason for these cross-cracks is presumably that the security thread is subjected to high tensile stress when it is embedded in the paper, so that the thread is stretched and this interrupts the metal layer which is rigid compared to the plastic material.

The invention is therefore based on the problem of providing a security document having a security thread embedded therein that possesses a predetermined electrical conductivity contributing to the authenticity of the paper, this conductivity being maintained over the entire length of the thread even under tensile stresses that occur during embedding in security papers.

This problem is solved by the features contained in the characterizing part of the main claim. Advantageous developments are the subject of the subclaims.

BRIEF SUMMARY OF THE INVENTION

The essence of the invention is that the metal coating with its especially high electrical conductivity is supplemented by a second conductive layer. This second layer need not attain the high conductivity values of the metal layer but should maintain its electrical conductivity after stretching, bending or similar mechanical stress, so that such mechanical stresses on the carrier material and the metal coatings do not directly cause a complete interruption of the electrical connection. Suitable materials for this second electrically conductive layer are e.g. soot particles or other electrically conductive pigments, which may be present in a plastic material, a layer of lacquer, a varnish or, as shown below in a special embodiment, also in an adhesive layer.

Since the cracks occurring in the metal coating are extremely fine the paths to be bridged electrically across the second conductive layer are short, so that the total conductivity is barely reduced in spite of the higher resistance of this layer. Therefore, one does not require very high pigment concentrations which could impair the workability of the varnishes.

This layer, like the metal layer, may be made extremely thin so that the thread can also be provided with further layers containing other substances contributing to authenticity, without becoming too thick to be embedded in paper.

Since even small concentrations of soot pigments lead to a change of color in the thread, the thread is preferably constructed in such a way that the metal coating covers the electrically conductive pigmented layer on the outside. Due to its reflecting properties this thread is not visible after being embedded in paper when regarded in incident light since the scattered light penetrating the paper layer is scattered back through the paper layer again in the same way. The thread can therefore also be readily embedded in the printed area of the bank note without having an adverse effect on its appearance. The cracks through which the dark pigmented layer therebelow is theoretically visible are so small that they cannot be seen by the naked eye. The thread is thus recognizable as such only in transmitted light.

In order to make the metallic property visible to the naked eye it is also known to embed the thread in the paper in such a way that it locally comes to the surface. This is a very striking optical distinguishing feature that cannot be reproduced in the same way by photographic or electrophotographic copying attempts.

In a special embodiment one constructs the thread, not of one carrier sheet, but of two accordingly thinner carrier sheets which are coated on the surfaces located on the inside in the finished thread with the metal coating and the second electrically conductive layer. These two sheets are then interconnected by an adhesive layer and thereafter embedded in the document, cut into threads. The outer plastic sheets protect the metal layer, i.e. also the electrically conductive second layer, sufficiently from mechanical stresses. Furthermore, this strip of sheet, due to its symmetrical structure, does not tend to curl or show a garland effect which would be extremely troublesome when the thread is being worked and in particular when it is embedded in the paper web.

Further advantages and advantageous developments are the object of the description of preferred embodiments of the invention with reference to figures. For the sake of clarity the drawings are not true to scale.

DETAILED DESCRIPTION OF PREFERRED EMBODIMENTS

Figure 1:
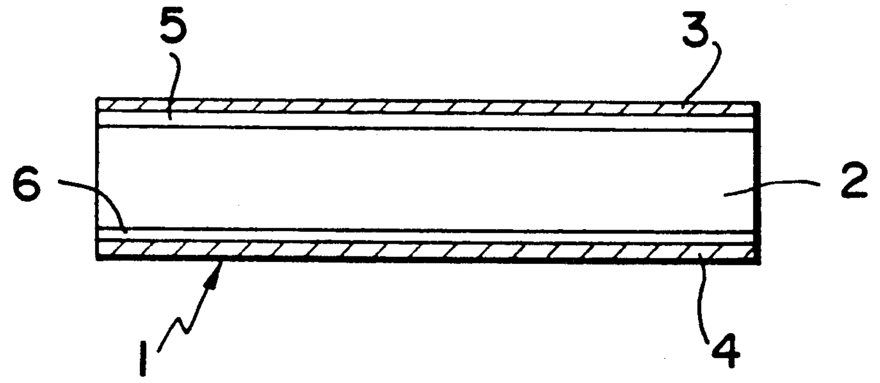
FIG. 1 shows a security thread in cross section with a one-layer carrier sheet.

FIG. 1 shows a security thread 1 in cross section having a carrier sheet 2 made of a high strength plastic, preferably polyester, which is covered on both sides, in the embodiment shown here, with electrically conductive metal layer materials 3 and 4. These metal layers are preferably vapor-deposited aluminum, nickel or chromium layes. Directly adjacent the metal layers are layers of varnish 5, 6 which are interspersed with electrically conductive pigments, e.g. soot particles. Due to the outer arrangment of metal coatings 3 and 4 on both sides, the thread has reflecting properties and is visible in this form—completely embedded in paper—only in transmitted light.

In simple embodiments the carrier sheet may also be provided on only one side with a metal layer and the electrically conductive auxiliary layer.

Figure 2:
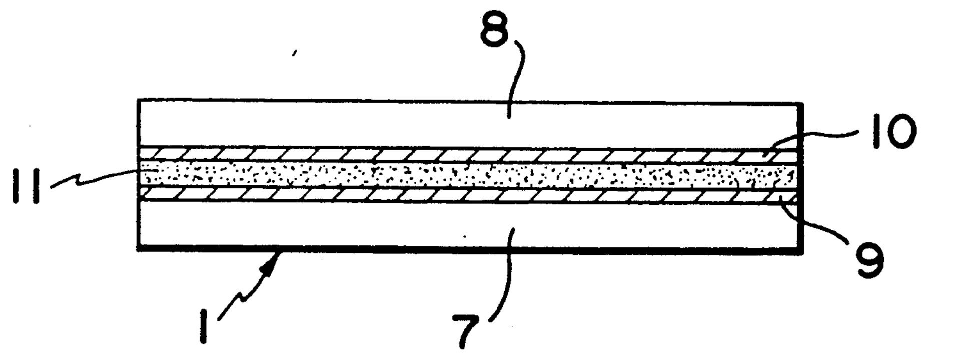
FIGS. 2 and 3 show various embodiments of security threads with two-layer carrier sheets.

FIG. 2 shows a special variation in which two carrier sheets 7, 8, whose thickness is accordingly smaller, are used for producing the thread. Each sheet is provided on one side with a metal coating 9, 10 by being vapor-plated with aluminum, nickel, chromium or a different metal before being joined together. Other methods for metalizing plastic sheets may also be used here (the hot embossing method, sputtering, etc.).

One or both metalized surfaces are in turn provided with an adhesive layer which contains soot pigments in traces. This adhesive (heat-set glu, polymerization glue, etc.) is then used to firmly interconnect the two sheets, whereupon the sheets are cut into suitable dimensions for use as a security thread. The special advantage of this embodiment is that this adhesive layer 11 also interconnects the two metal coatings 9, 10 electrically, thereby excellently compensating any interruptions in one metal layer resulting e.g. from errors during manufacture, coating, etc., by the opposite metal coating and the electrical connection via the adhesive layer. Such manufacturing errors thus end up merely reducing the electrical conductivity and not completely interrupting the electrical connection over the length of the thread.

Figure 3:
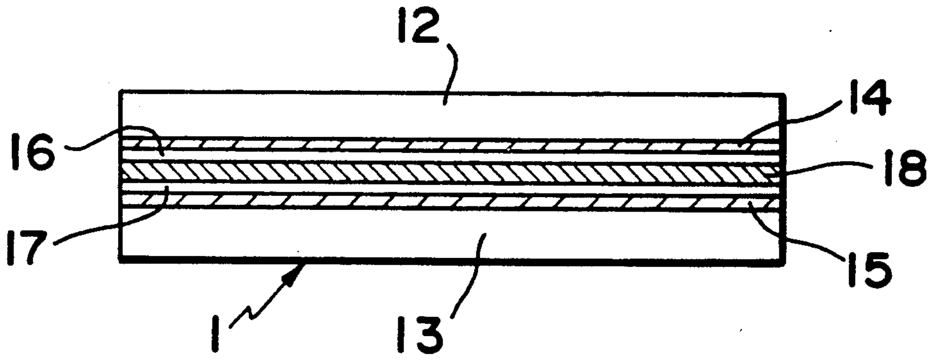

The electrically conductive pigments may also be applied together with other pigments likewise allowing for detection of authenticity (magnetic pigments, etc.) in a separate layer of varnish in or on the thread. The layers containing the feature substance are preferably enclosed here, too, in a symmetrical structure between two plastic sheets. Such a structure is shown in FIG. 3, whereby outer transparent plastic sheets 12, 13 may again be made of polyester. These polyester sheets are provided on their inside surfaces with a metal coating 14, 15 (aluminum, nickel, chromium, etc.) which is followed by a pigmented varnish layer 16, 17 in each case. These pigmented varnish layers contain e.g. magnetic pigments and soot particles. The two carrier sheets coated in this way are interconnected by a laminating adhesive layer 18, as already shown in the above example.

Instead of using a varnish layer or laminating adhesive layer interspersed with electrically conductive pigments, one may also use electrically conductive sheets. Such sheets are e.g. plastic sheets which either are interspersed with an electrically conductive pigment or already possess electrically conductive properties due to their molecular structure. These sheets need only be provided with the metal coating to obtain the desired effect of high electrical conductivity and a metallically shining surface, due to which the thread is visible only in transmitted light after being embedded in paper.

The security thread may be additionally printed or coated with a microprint or luminescent substances, if required. Due to its better printability compared to a metal coating, the outer plastic sheet, as shown in FIGS. 2 and 3, is particularly suitable for subsequent application of a microprint pattern optionally using luminescent inks.

We claim:

1. A security element having an embedded security element in the form of a thread or strip comprising at least one carrier sheet; at least one layer of metal associated with the carrier sheet; and at least one other electrically conductive layer associated with the carrier sheet and coextensive with the metal layer, said other layer comprising an electrically conductive non-metallic material comprising electrically conductive pigments or electrically conductive plastic directly adjacent and electrically connected with the metal layer, whereby said other layer maintains electrical continuity of said metal layer in case said metal layer is rendered electrically discontinuous by breakage.

2. A security element as claimed in claim 1, wherein said carrier sheet is formed of polyester.

3. A security element as claimed in claim 1, wherein said electrically conductive pigments comprises soot particles.

4. A security element as claimed in claim 1, wherein said carrier sheet comprises an electrically conductive plastic material.

5. A security element as claimed in claim 1, wherein said security element has a symmetric structure.

6. A security element as claimed in claim 1, said one other layer comprising a vanish layer containing said electrically conductive pigments.

7. A security element as claimed in claim 6, wherein said pigments comprise soot particles.

8. A security element as claimed in claim 6, including at least one other form of machine detectable pigments in said varnish layer.

9. A security element as claimed in claim 8, said other form of machine detectable pigments comprising magnetic pigments.

10. A security element as claimed in claim 6, including at least one other form of machine-detectable pigments in said varnish layer.

11. A security element as claimed in claim 10, said other form of pigments comprising magnetic pigments.

12. A security element as claimed in claim 1, wherein said security element comprises a pair of opposed carrier sheets having said layers of metal respectively associated therewith on their respective opposed surfaces, and a layer of adhesive connecting the carrier sheets along their opposed surfaces, said adhesive layer containing electrically conductive pigments and comprising said other layer.

13. A security element as claimed in claim 1, wherein said security element comprises a pair of opposed carrier sheets having said layers of metal respectively associated therewith on their respective opposed surfaces; a layer of adhesive connecting the carrier sheets along their opposed surfaces; and an intermediate layer between the metal layers and the adhesive layer, said intermediate layer containing conductive pigments and comprising said other layer.

14. A security element as claimed in claim 12 or 13, wherein said security element has a symmetric structure.

15. A security element as claimed in claim 13, wherein said adhesive layer is electrically conductive.

16. A security element as claimed in claim 13, wherein said intermediate layer comprises varnish.

17. A security element as claimed in claim 13, wherein said intermediate layer includes a different form of a machine-detectable pigments.

18. A security element as claimed in claim 17, wherein said different form of pigments comprises magnetic pigments.

19. A security element as claimed in claim 17, wherein said intermediate layer comprises varnish.

* * * * *